United States Patent
Hoek et al.

(10) Patent No.: US 7,563,745 B2
(45) Date of Patent: Jul. 21, 2009

(54) SHAPED CATALYST PARTICLES FOR HYDROCARBON SYNTHESIS

(75) Inventors: Arend Hoek, Amsterdam (NL); Hans Michiel Huisman, The Hague (NL); Carolus Matthias Anna Maria Mesters, Amsterdam (NL)

(73) Assignee: Shell Oil Company, Houston, TX (US)

( * ) Notice: Subject to any disclaimer, the term of this patent is extended or adjusted under 35 U.S.C. 154(b) by 797 days.

(21) Appl. No.: 10/517,098

(22) PCT Filed: Jun. 6, 2003

(86) PCT No.: PCT/EP03/06114

§ 371 (c)(1),
(2), (4) Date: Feb. 22, 2005

(87) PCT Pub. No.: WO03/103833

PCT Pub. Date: Dec. 18, 2003

(65) Prior Publication Data

US 2005/0130837 A1 Jun. 16, 2005

(30) Foreign Application Priority Data

Jun. 7, 2002 (EP) .................. 02253980

(51) Int. Cl.
*B01J 23/00* (2006.01)
*B01J 21/00* (2006.01)
*B01J 20/00* (2006.01)
*B01J 29/00* (2006.01)
*B01J 37/00* (2006.01)
*C01B 3/38* (2006.01)
*C07C 1/02* (2006.01)
*C01B 3/26* (2006.01)
*C10G 47/00* (2006.01)
*C10G 47/02* (2006.01)
*C10G 47/04* (2006.01)
*C10G 11/00* (2006.01)
*C10G 35/06* (2006.01)

(52) U.S. Cl. ............ 502/326; 502/258; 502/259; 502/260; 502/261; 502/262; 502/263; 502/327; 502/332; 502/333; 502/334; 502/335; 502/336; 502/337; 502/338; 502/339; 502/350; 502/355; 502/415; 502/439; 502/527.12; 502/527.17; 252/373; 423/651; 208/111.35; 208/112; 208/113; 208/120.35; 208/121; 208/137

(58) Field of Classification Search ............ 502/258, 502/259, 260, 261, 262, 263, 326, 327, 332, 502/333, 334, 335, 336, 337, 338, 339, 350, 502/355, 415, 439, 527.12, 527.17; 252/373; 423/651; 208/111.35, 112, 113, 120.35, 208/121, 137

See application file for complete search history.

(56) References Cited

U.S. PATENT DOCUMENTS

| | | | |
|---|---|---|---|
| 3,764,565 A | 10/1973 | Jacobs et al. | 252/470 |
| 4,028,221 A | 6/1977 | Sze et al. | 208/8 |
| 4,116,817 A * | 9/1978 | Frayer et al. | 208/210 |
| 4,116,819 A * | 9/1978 | Frayer et al. | 208/216 R |
| 4,118,310 A * | 10/1978 | Frayer et al. | 208/210 |
| 4,133,777 A * | 1/1979 | Frayer et al. | 502/309 |
| 4,328,130 A * | 5/1982 | Kyan | 502/100 |
| 4,342,643 A * | 8/1982 | Kyan | 208/134 |
| 4,391,740 A * | 7/1983 | Gibson | 502/305 |
| 4,394,303 A * | 7/1983 | Gibson | 502/305 |
| 4,489,173 A * | 12/1984 | Gibson | 502/313 |
| 4,517,077 A | 5/1985 | Clements | 208/216 R |
| 4,606,815 A * | 8/1986 | Gibson | 208/210 |
| 4,628,001 A | 12/1986 | Sasaki et al. | 428/367 |
| 4,645,654 A | 2/1987 | Barczak | 423/244 |
| 4,645,754 A | 2/1987 | Tamura et al. | 502/527 |
| 4,673,664 A | 6/1987 | Bambrick | 502/439 |
| 4,975,032 A | 12/1990 | Arai et al. | 418/150 |
| 6,005,121 A | 12/1999 | Ebner et al. | 549/259 |

FOREIGN PATENT DOCUMENTS

| | | |
|---|---|---|
| AU | 698392 | 10/1998 |
| DE | 3315105 | 11/1983 |
| EP | 0 127 220 | 12/1984 |
| EP | 0 218 147 | 4/1987 |

| EP | 0 220 933 | 5/1987 |
| EP | 0 428 223 | 5/1991 |
| EP | 0464633 | 6/1991 |
| EP | 0 455 307 | 11/1991 |
| EP | 0 510 770 | 10/1992 |
| EP | 0678331 | 3/1995 |
| GB | 1446175 | 8/1976 |
| JP | 55119445 | 9/1980 |
| WO | 99/34917 | 7/1999 |
| WO | 03/013725 | 2/2003 |

OTHER PUBLICATIONS

I. Naka et al. (J. Japan Petrol. Inst., vol. 23, No. 4, 1980, pp. 268-273) entitled: "Hydrodesulfurization Activity of Catalysts with Non-cylindrical Shape".
International Search Report dated Sep. 11, 2003.

* cited by examiner

*Primary Examiner*—Cam N Nguyen

(57) ABSTRACT

The invention relates to a shaped catalyst or catalyst precursor containing a catalytically active component or a precursor therefore, the component selected from elements of Group VIII of the Periodic Table of the Elements, supported on a carrier, which catalyst or catalyst precursor is an elongated shaped particle having three protrusions each extending from and attached to a central position, wherein the central position is aligned along the longitudinal axis of the particle, the cross-section of the particle occupying the space encompassed by the outer edges of six circles around a central circle, each of the six circles touching two neighboring circles while three alternating circles are equidistant to the central circle and may be attached to the central circle, minus the space occupied by the three remaining outer circles and including the six interstitial regions.

Figure 1:
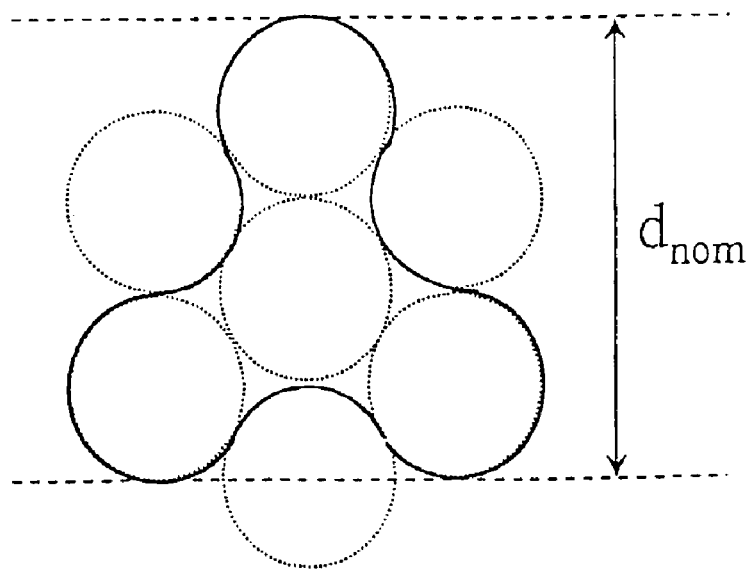

The invention further relates to a process to prepare the catalyst or catalyst precursor from a shapeable dough, to the die-plate used for the preparation of an extruded catalyst or catalyst precursor, to the use of the catalysts, as well as to hydrocarbons prepared by using the catalyst.

The invention further relates to a process to obtain fuels and optionally base oils, by hydrogenation, hydroisomerisation and/or hydrocracking of the hydrocarbons prepared by using the catalyst.

17 Claims, 1 Drawing Sheet

SHAPED CATALYST PARTICLES FOR HYDROCARBON SYNTHESIS

PRIORITY CLAIM

The present application claims priority on European Patent Application 02253980.3 filed 7 Jun. 2002.

FIELD OF THE INVENTION

The present invention relates to a shaped catalyst or catalyst precursor, containing a catalytically active component or a precursor therefor, the component selected from elements of Group VIII of the Periodic Table of the Elements, supported on a carrier, the catalyst or catalyst precursor optionally containing one or more elements or compounds from Groups IIA, IIIB, IVB, VB, VIB, VIIB or Group VIII of the Periodic Table of the Elements.

The invention further relates to a process to prepare the catalyst or catalyst precursor from a shapeable dough, to the die-plate used for the preparation of an extruded catalyst or catalyst precursor, as well as to hydrocarbons prepared by using the catalyst.

The invention further relates to a process to prepare fuels and base oils, by hydrogenation, hydroisomerisation and/or hydrocracking of the aforementioned hydrocarbons.

BACKGROUND OF THE INVENTION

Shaped catalysts or catalyst precursors are known in the art and have been described, for example in European Patent EP-0,127,220.

The preparation of hydrocarbons from a gaseous mixture comprising carbon monoxide and hydrogen by contacting the mixture with a catalyst at elevated temperature and pressure is known in the literature as the Fischer-Tropsch synthesis.

Catalysts used in the Fischer-Tropsch synthesis often comprise one or more metals from Group VIII of the Periodic Table of the Elements, optionally in combination with one or more metal oxides and/or other metals as promoters.

It is desirable to employ a highly efficient catalyst. In terms of the Fischer-Tropsch process, a highly efficient catalyst is one which exhibits not only a high level of activity for the conversion of carbon monoxide and hydrogen to hydrocarbons, but also a high degree of selectivity to higher molecular hydrocarbons, in particular $C_5$ hydrocarbons and larger, henceforth referred to as "$C_5+$ hydrocarbons". Preferably, the degree of branching in the $C_5+$ hydrocarbons should be low. It is taught in the prior art that the efficiency of a catalyst in general increases as the size of the catalyst particle decreases. Further, catalysts should show a high stability, i.e. deactivation should be very low.

The Fischer-Tropsch synthesis may be carried out using a variety of reaction regimes, for example a fluidized bed regime or a slurry bed regime. When using a process employing a fixed bed of catalyst particles, a major consideration in the design of the process is the pressure drop through the catalyst bed. It is most desirable that the pressure drop should be as low as possible. However, it is well reported in the art that, for a given shape of catalyst particles, as the size of the catalyst particles in a fixed bed is reduced, there is a corresponding increase in pressure drop through the catalyst bed. Thus, there exists a conflict in the design of fixed catalysts beds when trying to achieve a satisfactory level of catalyst efficiency while keeping the pressure drop through the bed to a minimum.

In addition to the above, the catalyst particles should be sufficiently strong to avoid undesired attrition and/or breakage. Especially in fixed beds the bulk crush strength should be (very) high, as beds are used in commercial reactors of up to 15 meters in height. Especially at the lower end of the bed the strength of the catalyst particles plays an important role. This is an additional complication in designing further improved catalyst particles.

A still further complicating element is the manufacturing process of catalyst particles. There is a need for a fast, relatively inexpensive and suitable manufacturing process which will enable the production of catalyst particles in large quantities. One example of such a commercially available manufacturing process is an extrusion process.

Accordingly, there exists a need for a catalyst or catalyst precursor comprising a Group VIII element and optionally a promoter selected from the elements of Group IIA, Group IIIB, Group IVB, Group VB, Group VIB or Group VIIB of the Periodic Table of the Elements which catalyst displays a high activity and selectivity in the Fischer-Tropic synthesis process, while keeping the pressure drop in the fixed bed as low as possible and displaying a high crush strength and stability.

In the past a tremendous amount of work has been devoted to the development of particles, in particular catalytically active particles, for many different processes. There has also been a considerable effort to try to understand the advantages and sometimes disadvantages of effects of shape when deviating from conventional shapes such as pellets, rods, spheres and cylinders for use in catalytic as well as non-catalytic duties.

Examples of further well-known shapes are rings, cloverleafs, dumbells and C-shaped particles. Considerable efforts have been devoted to the so-called "polylobal"-shaped particles. Many commercial catalysts are available in TL (Trilobe) or QL (Quadrulobe) form. They serve as alternatives to the conventional cylindrical shape and often provide advantages because of their increased surface-to-volume ratio, which results in a smaller effective particle size, thus providing a more active catalyst.

A variety of shapes and designs of catalyst particles for use in the fixed bed operation of the Fischer-Tropsch synthesis have been proposed. Thus, EP-0,428,223 discloses that the catalyst particles may be in the form of cylinders; hollow cylinders, for example cylinders having a central hollow space which has a radius of between 0.1 and 0.4 of the radius of the cylinder; straight or rifled (twisted) trilobes; or one of the other forms disclosed in U.S. Pat. No. 4,028,221. Trilobe extrudates are said to be preferred.

EP-0,218,147 discloses a helical lobed, polylobal extrudate particle having the outline shape of three or four strands helically wound about the axis of extrusion along the length of the particle and its use as a catalyst or catalyst support, in particular as a catalyst or catalyst support in hydrotreating operations. The helical shape of the catalyst is said to reduce the pressure drop across fixed bed reactors through which liquid and/or gas reactants are passed. In this way, smaller catalyst particles can be employed in a given reactor design to meet the pressure drop requirements.

In EP-0,220,933, it is described that the shape of quadrulobe-type catalysts is important, in particular with respect to a phenomenon known as pressure drop. From the experimental evidence provided it appears that asymmetric quadrulobes suffer less from pressure drop than the closely related symmetrical quadrulobes. The asymmetrically shaped particles are described in EP-0,220,933 by way of each pair of protrusions being separated by a channel which is narrower than the protrusions to prevent entry thereinto by the protrusions of an adjacent particle. It is taught in EP-0,220,933 that the shape of the particles prevents them from "packing" in a bed causing the overall bulk density of the catalyst bed to be low.

Since many of the findings in the art are conflicting and pressure drop problems continue to be in existence, especially when surface-to-volume ratios are increased by reducing particle size, there is still considerable room to search for alternative shapes of catalytically active particles which would diminish or even prevent such problems.

It would be useful to find specifically shaped catalyst particles or catalyst precursor particles that offered unexpected and sizeable advantages compared with conventional "trilobal" catalyst particles, especially when used in mass transfer or diffusion limited reactions in fixed-bed reactors, for instance as catalysts in the Fisher-Tropsch process.

SUMMARY OF THE INVENTION

The present invention is directed to a shaped catalyst or catalyst precursor a catalytically active component or a precursor therefore, the component selected from elements of Group VIII of the Periodic Table of the Elements, supported on a carrier, which catalyst or catalyst precursor is an elongated shaped particle comprising three protrusions each extending from and attached to a central position, wherein the central position is aligned along the longitudinal axis of the particle, the cross-section of the particle occupying the space encompassed by the outer edges of six circles around a central circle, each of the six circles touching two neighboring circles while three alternating circles are equidistant to the central circle and may be attached to the central circle, minus the space occupied by the three remaining outer circles and including the six interstitial regions.

DETAILED DESCRIPTION OF THE INVENTION

The type of reactions which require solid catalyst particles are often limited by the rate of diffusion of the reactants into the catalyst particle or by the rate of diffusion of the evolving products out of the catalyst particle. This is especially true for liquid phases reactions. Accordingly, catalyst particles which display a high surface-to-volume ratio are advantageous.

It has been found that the catalyst particles according to the present invention have a larger surface-to-volume ratio than corresponding conventional "trilobal" particles of similar size and suffer substantially less from pressure drop than such corresponding conventional "trilobal" particles, due to higher voidage. In addition, a good $C_5+$ selectivity and a good stability is obtained. An additional advantage is that the selectivity for linear (unbranched) products is increased. Further, the particles are sufficiently strong and may easily be made by extrusion.

The shaped catalyst particles may be formed of any suitable material provided it is capable of being processed in such a way that the intended shape is obtained. Methods of preparing such shapes include pressing, extruding or otherwise forcing a granular or powdered catalyst or catalyst precursor material into various shapes under certain conditions, which will ensure that the particle retains the resulting shape, both during reaction as well as during regeneration.

The catalysts of the present invention, especially for use in the Fischer-Tropsch process, comprise, as the catalytically active component; a metal from Group VIII of the Periodic Table of the Elements. Particular catalytically active metals include ruthenium, iron, cobalt and nickel, more preferably cobalt. Combinations of two or more components are also possible. Preferably, a Fischer-Tropsch catalyst is used; which yields substantial quantities of paraffins, more preferably substantially unbranched paraffins. A most suitable catalyst composition for this purpose includes a cobalt-containing Fischer-Tropsch catalyst. Such catalysts are described in the literature, see e.g. AU 698392 and WO 99/34917. Preferred hydrocarbonaceous feeds for the preparation of synthesis gas are natural gas or associated gas. As these feedstocks usually result in synthesis gas having $H_2/CO$ ratio's of close to 2, cobalt is a very good Fischer-Tropsch catalyst as the user ratio for this type of catalysts is also about 2.

The catalytically active metal is preferably sup-ported on a porous carrier. The porous carrier may be selected from any of the suitable refractory metal oxides or silicates or combinations thereof known in the art. Particular examples of preferred porous carriers include silica, alumina, titania, zirconia, ceria, gallia and mixtures thereof, especially silica, alumina and titania, especially $TiO_2$.

The amount of catalytically active metal on the carrier for optimum performance is preferably in the range of from 3 to 300 pbw per 100 pbw of carrier material, more preferably from 10 to 80 pbw, especially from 20 to 60 pbw.

If desired, the catalyst may also comprise one or more metals or metal oxides as promoters. Suitable metal oxide promoters may be selected from Groups IIA, IIIB, IVB, VB, VIB or Group VIIB of the Periodic Table of the Elements, or the actinides and lanthanides. In particular, oxides of magnesium, calcium, strontium, barium, scandium, yttrium, lanthanum, titanium, zirconium, hafnium, cerium, thorium, uranium, vanadium, chromium and manganese are very suitable promoters. Particularly preferred metal oxide promoters for the catalyst used to prepare heavy paraffins are manganese, vanadium and zirconium oxide. Suitable metal promoters may be selected from Groups VIIB or VIII of the Periodic Table of the Elements. Rhenium, silver and Group VIII noble metals are particularly suitable, with platinum and palladium being especially preferred. The amount of promoter present in the catalyst is suitably in the range of from 0.01 to 100 pbw, preferably 0.1 to 40, more preferably 1 to 20 pbw, per 100 pbw of carrier. The most preferred promoters are selected from vanadium, manganese, rhenium, zirconium and platinum in view of their ability to produce long chain n-paraffins.

The catalytically active metal and the promoter, if present, may be deposited on the carrier material by any suitable treatment, such as impregnation, mixing/kneading and mixing/extrusion. After deposition of the metal and, if appropriate, the promoter on the carrier material, the loaded carrier is typically subjected to calcination. The effect of the calcination treatment is to remove crystal water, to decompose organic compounds and to convert inorganic compounds to their respective oxides. After calcination, the resulting catalyst may be activated by contacting the catalyst with hydrogen or a hydrogen-containing gas, typically at temperatures of about 200 to 350° C. Other processes for the preparation of Fischer-Tropsch catalysts comprise kneading/mulling, followed by extrusion, drying/calcination and activation.

The suitable material for the shaped catalyst particles should be processed in such a way that the intended shape is obtained. One example of a processing method is an extrusion process, wherein a shapeable dough, preferably comprising one or more sources for one or more of the catalytically active elements, and optionally one or more sources for one or more of the promoters and the finely divided refractory oxide or refractory oxide precursor is mulled together with a suitable solvent. The mulled mixture is then extruded through an orifice in a die-plate. The resulting extrudates are dried. If necessary, (additional) catalytic element sources and/or promoters may be applied to the extrudates by impregnation. Other processes which may be used are palletizing and pressure molding.

The solvent for inclusion in the mixture may be any of the suitable solvents known in the art. Examples of suitable solvents include water; alcohols, such as methanol, ethanol and propanol; ketones, such as acetone; aldehydes, such as propanal; and aromatic solvents, such as toluene. A most convenient and preferred solvent is water, optionally in combination with methanol.

The use of specific die-plates enables the formation of the intended shape of the catalyst particles. Die-plates are known in the art and may be made from metal or polymer material, especially a thermoplastic material.

Preferred catalyst particles according to the present invention have a cross-section in which the three alternating circles (forming part of the outer circles) have diameters in the range of between 0.74 and 1.3 times the diameter of the central circle, preferably between 0.87 and 1.15 times the diameter of the central circle.

More preferred catalyst particles according to the present invention are those having a cross-section in which the three alternating circles have the same diameter as the central circle. Suitably the distance between the three alternating circles and the central circle is the same. This distance is preferably less than half the diameter of the central circle, more preferably less than a quarter of the diameter of the central circle, with most preference given to particles having a cross-section in which the three alternating circles are attached to the central circle. Preferably the three alternating circles do not overlap with the central circle. In case of any overlap, the overlap of each alternating circle and the central circle will be less than 5% of the area of the central circle, preferably less than 2%, more preferably less than 1%.

In FIG. 1 a cross-sectional view of the most preferred particles according to the invention has been depicted. The surface of the cross-sectional shape is (indicated by the solid line). It will be clear from Fig. (depicting the cross-section of the preferred particles) that in the concept of six circles of equal size aligned around a central circle of the same size each outer circle borders its two neighbor circles and the central circle while subtraction of three alternating outer circles (indicated by the dotted line) provides the remaining cross-section, built up from four circles (the central circle and the three remaining alternating outer circles) together with the six areas formed by the inclusions of the central circle and six times two adjacent outer circles. These areas are referred to as "interstitial areas". The three remaining alternating outer circles are equidistant to the central circle. The term "equidistant" as used herein refers to the circumstance that the distance between the center of the central circle to the center of one of the outer circles is equal to the distance between the center of the central circle to the centre of either one of the other remaining outer circles. For the purpose of this specification the term "equidistant" may comprise deviations up to 20% of the distance, preferably up to 10%, more preferably up to 5%. In the most preferred embodiment there is no deviation. The circumference of the preferred shaped particles according to the present invention is such that it does not contain sharp corners, which can also be expressed as the derivative of the cross-section being continuous. The diameter of the particles (the most preferred particles in accordance with the present invention) is defined as the distance between the tangent line that touches two protrusions and a line parallel to this tangent line that touches the third protrusion. It is indicated as d nom in FIG. 1. In the case that the three alternating circles have one or two different diameters, d nom is the sum of the three measured diameters divided by three.

Figure 2:
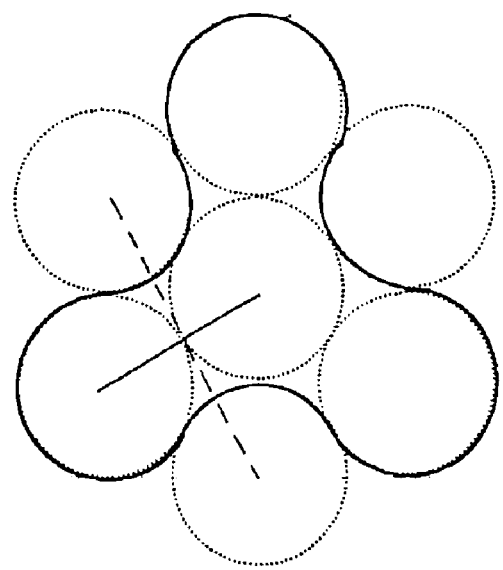

The three protrusions and the central position together form the cross-section of the catalyst or catalyst precursor. The main part of each protrusion is formed by one of the (remaining) alternating circles. The main part of the central protrusion is formed by the central circle. The interstitial areas are divided between the central position and the protrusion by a line perpendicular to the line connecting the center point of the central circle and the center part of the alternating circle. The perpendicular line (dotted line) crosses the connecting line (solid line) at a point exactly in the middle between the two center points (see FIG. 2).

It will be clear that minor deviations from the shape as defined are considered to be within the scope of the present invention. In the case where the catalyst or catalyst precursor of the present invention is prepared by an extrusion process, die-plates are used. It is known to those skilled in the art to manufacture die-plates having one or more holes in the desired shape of the particles, in this case according to the present invention. Tolerances may be expected in practice when producing such die-plates. In this respect it is observed that the pressure release immediately after extrusion may result in deformation of the extrudates. Usually the minor deviations are within 10%, preferably within 5%, more preferably within 2% of d nom with respect to the ideal shape as defined in the present invention.

After a typical process of preparation of the catalyst or catalyst precursor particles of the invention, between 10% and 100% of the number of particles produced preferably have a nominal diameter with a deviation of less than 5% of the shape as defined in the present invention. Preferably, at least 50% of the catalyst particles have a nominal diameter with a deviation of less than 5% of the shape as defined in the present invention.

It is possible to produce catalyst particles according to the present invention which also contain one or more holes along the length of the particles. For instance, the particles can contain one or more holes in the area formed by the central cylinder (the central circle in the cross-section given in FIG. 1) and/or one or more holes in one or more of the alternating cylinders (the alternating circles in the cross-section given in FIG. 1). The presence of one or a number of holes causes an increase of the surface to volume ratio which in principle allows exposure of more catalytic sites and, in any case, more exposure to incoming charges which may work advantageously from a catalytic point of view. Since it becomes increasingly difficult to produce hollow particles as their size becomes smaller it is preferred to use porous particles without holes when smaller sizes are desired for certain purposes.

It has been found that the voidage of the catalyst particles according to the present invention is well above 50% (voidage being defined as the volume fraction of the open space present in a bed of particles outside the particles present, i.e. the volume of the pores inside the particles are not included in the voidage). The particles used in the experiment to be described hereinafter had a voidage of typically 58% which is substantially above that of the comparative "trilobal" particle, the voidage of which amounted to just over 43%. The voidage of a bed of catalyst particles according to the invention is suitably between 45 and 80%, preferably between 50 and 70%, more preferably between 55 and 65%.

The catalyst particles according to the present invention may be described as having a length/diameter ratio (L/D) of at least 1. The particles according to the present invention may have a L/D in the range between 1 and 25. Preferably, the particles according to the present invention have a L/D in the range between 1.5 and 20, more preferably in the range between 2 and 10. For example, the particles used in the experiment to be described hereinafter had a L/D of about 2.5.

The length of the particles in accordance with the present invention is suitably in the range between 1 and 25 mm, preferably in the range between 2 and 20 mm, depending on the type of application envisaged.

The catalytic conversion process may be performed under conventional synthesis conditions known in the art. Typically, the catalytic conversion may be effected at a temperature in the range of from 150° C. to 300° C., preferably from 180° C. to 260° C. Typical total pressures for the catalytic conversion process are in the range of from 1 bar to 200 bar absolute, more preferably from 10 bar to 70 bar absolute. In the catalytic conversion process especially more than 75 wt % of $C_5+$, preferably more than 85 wt % $C_5+$ hydrocarbons are formed. In a typical conversion process using a catalyst according to the present invention, the amount of products comprising one or more tertiary substituted carbon atoms (henceforth referred to as "branched" products) may be at least 20% less compared to a conversion process with similar reaction conditions, where a conventional trilobal catalyst is used. Depending on the catalyst and the conversion conditions, the amount of heavy wax ($C_{20}+$) may be up to 60 wt %, sometimes up to 70 wt %, and sometimes even up to 85 wt %. Preferably a cobalt catalyst is used, a low $H_2$/CO ratio is used (especially 1.7, or even lower) and a low temperature is used (190-230° C.). To avoid any coke formation, it is preferred to use an $H_2$/CO ratio of at least 0.3. It is especially preferred to carry out the Fischer-Tropsch reaction under such conditions that the SF-alpha value, for the obtained products having at least 20 carbon atoms, is at least 0.925, preferably at least 0.935, more preferably at least 0.945, even more preferably at least 0.955. Preferably the Fischer-Tropsch hydrocarbons stream comprises at least 35 wt % $C_{30}+$, preferably 40 wt %, more preferably 50 wt %.

The Fischer-Tropsch process may be a slurry FT process, especially an ebulated bed process or a fixed bed FT process, especially a multitubular fixed bed process. It has been found that the beds containing particles according to the invention have—in a random packing—a much higher voidage than beds containing the corresponding conventional trilobes when packed using the well known "sock loading" technique. The voidage obtained when using the conventional trilobal shape amounts up to about 45% whereas use of the particles according to the present invention produces a voidage of at least 55% which makes such particles attractive for low pressure drop applications, for instance the Fischer-Tropsch synthesis process.

The catalyst particles described herein can also be formed as helical lobed particles. The term helical lobed particles as used herein refers to an elongated shaped particle comprising three protrusions each extending from and attached to a central position, the central position being aligned along a longitudinal axis, the particle having a cross-section occupying the space encompassed by the outer edges of six circles around a central circle, each of the six circles bordering two neighboring circles while three alternating circles are equidistant to the central circle and may be attached to the central circle, minus the space occupied by the three remaining outer circles and including the six interstitial regions, which protrusions extend along and are helically wound about the longitudinal axis of the particle.

By employing helical lobed particles, a larger diameter helical lobed catalyst particle may be employed to achieve a given selectivity than is necessary when employing straight lobed particles, resulting in a greater reduction in pressure drop across the catalyst bed than expected from the prior art. Alternatively, for a given design of fixed bed with a predetermined pressure drop, by employing the helical lobed particles in the Fischer-Tropsch process a substantially higher selectivity may be achieved than with the appropriate straight lobed particles necessary to meet the pressure drop requirements.

The invention will now be illustrated by means of the following non-limiting examples.

Experiments were carried out to monitor the Fischer-Tropsch process using catalyst particles made up of trilobe-shaped extrudates (comparative example) and using catalyst particles according to the invention (working examples).

Example I

Preparation of Trilobe-Shaped Catalyst Particles (Comparative)

Trilobe-shaped catalyst particles were prepared as follows. A mixture was prepared containing 143 g commercially available titania powder (P25 ex. Degussa), 66 g commercially available Co(OH)$_2$ powder, 10.3 g Mn(Ac)$_2$.4H$_2$O and 38 g water. The mixture was kneaded for 15 minutes. The mixture was shaped using a Bonnot extruder. The resulting extrudates were dried and calcined. The resulting extrudates contained 20 wt % Co and 1 wt % Mn. The resulting catalyst particles had a trilobal shape having a nominal diameter of 1.7 mm (Catalyst A).

Example II

Preparation of Catalyst Particles According to the Present Invention

A mixture was prepared containing 143 g commercially available titania powder (P25 ex. Degussa), 66 g commercially available Co(OH)$_2$ powder, 10.3 g Mn(Ac)$_2$.4H$_2$O and 38 g water. The mixture was kneaded for 15 minutes. The mixture was shaped using a Bonnot extruder equipped with an appropriate dieplate to obtain the desired shape as desired in claim 1. The resulting extrudates were dried and calcined. The resulting catalyst particles contained 20 wt % Co and 1 wt % Mn and had shapes as defined in claim 1 with nominal diameters of 1.7 mm (Catalyst B), 1.5 mm (Catalyst C), 1.3 mm (Catalyst D) and 1.0 mm (Catalyst E) respectively.

Example III

Catalysts A and B were tested in a process for the preparation of hydrocarbons. Micro-flow reactors containing 10 ml of catalyst extrudates A and B, respectively, in the form of a fixed bed of catalyst particles, were heated to a temperature of 260° C., and pressurised with a continuous flow of nitrogen gas to a pressure of 2 bar abs. The catalysts were reduced in-situ for 24 hours with a mixture of nitrogen and hydrogen gas. During reduction the relative amount of hydrogen in the mixture was gradually increased from 0% to 100%. The water concentration in the off-gas was kept below 3000 ppmv.

Following reduction, the pressure was increased to 32 bara (STY 140) or 57 bara (STY 180). The reaction was carried out with a mixture of hydrogen and carbon monoxide. The space time yield (STY), expressed as grams hydrocarbon product per liter catalyst particles (including the voids between the particles) per hour, the $C_5+$ selectivity, expressed as a weight percentage of the total hydrocarbon product, and the ratio of unsaturated product versus saturated product for products having between 2 and 4 hydrocarbons were determined for each experiment after 50 hours of operation. The results are set out in Table I.

TABLE I

|  | Relative STY g/lcat/h | Relative $C_5+$ selectivity (%) | Relative $CO_2$ sel (%) |
|---|---|---|---|
| Catalyst B | 140 | 102.0 | 64.0 |
|  | 180 | 104.0 | 55.0 |

In Table I, the results regarding $C_5+$ selectivity resulting from the use of catalyst B are expressed relative to the results obtained from the use of catalyst A, i.e. the $C_5+$ selectivity of catalyst A is taken to be 100%.

From the results it is clear that catalyst B gives a better performance than catalyst A with respect to $C_5+$ selectivity in the Fischer-Tropsch process. The performance of catalyst B is better even though the amount of active material per volume reactor is smaller for catalyst B than for catalyst A, due to the higher voidage. Thus, the specific shape of the catalyst B particles enables a better use of the expensive catalyst material.

Example IV

Catalysts A, C, D and E were tested in a process for the preparation of hydrocarbons. Micro-flow reactors containing 10 ml of catalyst extrudates A, C, D and E, respectively, in the form of a fixed bed of catalyst particles, were heated to a temperature of 260° C., and pressurized with a continuous flow of nitrogen gas to a pressure of 2 bar abs. The catalysts were reduced in-situ for 24 hours with a mixture of nitrogen and hydrogen gas. During reduction, the relative amount of hydrogen in the mixture was gradually increased from 0% to 100%. The water concentration in the off-gas was kept below 3000 ppmv.

Following reductions the pressure was increased to 26 bar abs. The reaction was carried out with a mixture of hydrogen and carbon monoxide. The reaction temperature is expressed as the weighted average bed temperature (WABT) in ° C. The space time yield (STY), expressed as grams hydrocarbon product per liter catalyst particles (including the voids between the particles) per hour, the $C_5+$ selectivity, expressed as a weight percentage of the total hydrocarbon product, and the ratio of unsaturated product versus saturated product for products having between 2 and 4 hydrocarbons were determined for each experiment after 50 hours of operation. The results are set out in Table II.

TABLE II

|  | Catalyst C | | Catalyst D | | Catalyst E | |
| --- | --- | --- | --- | --- | --- | --- |
| Inert, % | 0 | 50 | 0 | 50 | 0 | 50 |
| Relative STY | 200 | 132 | 200 | 132 | 200 | 132 |
| Relative $C_5$ + sel, % w/Cl+ | 103 | 103 | 104 | 103 | 104 | 103 |
| Relative $C_{11}$-$C_{14}$ olefinicity, % w | 184 | 238 | 183 | 320 | 184 | 315 |

In Table II, the results from the use of catalysts C, D or E are expressed relative to the results obtained from the use of catalyst A.

From the results in Table II it is clear that catalysts C, D and E give a better performance than catalyst A in the Fischer-Tropsch process. The performance of catalysts C, D and E is better even though the amount of active material per volume reactor is smaller for catalysts C, D and E than for catalyst A, due to the higher voidage. Thus, the specific shape of catalyst C, D and E particles enables a better use of the expensive catalyst material.

We claim:

1. A shaped catalyst or catalyst precursor containing a catalytically active component or a precursor thereof, wherein the component is selected from the group consisting of ruthenium, iron, cobalt and nickel, supported on a cater, which catalyst or catalyst precursor is an elongated shaped particle comprising three protrusions each extending from and attached to a central position, wherein the central position is aligned along the longitudinal axis of the particle, the cross-section of the particle occupying the space encompassed by the outer edges of six circles around a central circle, each of the six circles touching two neighboring circles while three alternating circles are equidistant to the central circle and may be attached to the central circle, minus the space occupied by the three remaining outer circles and including the six interstitial regions, the shaped catalyst or catalyst precursor having a cross-section in which the three remaining alternating circles have diameters in the range between 0.74 and 1.3 times the diameter of the central circle, the overlap of each alternating circle and the central circle being less than 5% of the area of the central circle.

2. The shaped catalyst or catalyst precursor of claim 1, wherein the protrusions are helically wound around the longitudinal axis of the particle.

3. The shaped catalyst or catalyst precursor of claim 1, having a nominal diameter D in the range between 0.5 and 5 mm.

4. The shaped catalyst or catalyst precursor of claim 1, wherein the catalytically active component or a precursor therefore is cobalt.

5. The shaped catalyst or catalyst precursor of claim 1, further containing an element or compound selected from the group consisting of Group IIA, IIIB, IVB, VB, VIB and, VIIB of the Periodic Table of the Elements.

6. The shaped catalyst or catalyst precursor of claim 1, wherein the cater is a refractory oxide.

7. The shaped particle of claim 6, wherein the refractory oxide is selected from the group consisting of silica, alumina and titania.

8. The shaped catalyst or catalyst precursor of claim 1, having a cross-section in which the three remaining alternating circles have diameters in the range between 0.87 and 1.15 times the diameter of the central circle.

9. The shaped particle of claim 8, having a cross section in which the three remaining alternating circles have the same diameter as the central circle.

10. The shaped particle of claim 8, wherein the three alternating circles are attached to the central circle.

11. The shaped catalyst or catalyst precursor of claim 1, having a length to diameter ratio (mm/mm) of between 1 and 25 and a length in the range between 1 and 25 mm.

12. The shaped catalyst or catalyst precursor of claim 11, having a length to diameter ratio between 2 and 10 and a length between 2 mm and 20 mm.

13. A process for the preparation of a catalyst or catalyst precursor containing a catalytically active component or a precursor therefore, the component selected from the group consisting of ruthenium, iron, cobalt and nickel, supported on a carrier, which catalyst or catalyst precursor is an elongated shaped particle comprising three protrusions each extending from and attached to a central position, wherein the central position is aligned along the longitudinal axis of the particle, the cross-section of the particle occupying the space encompassed by the outer edges of six circles around a central circle, each of the six circles touching two neighboring circles while three alternating circles are equidistant to the central circle and may be attached to the central circle, minus the space occupied by the three remaining outer circles and including the six interstitial regions, the shaped catalyst or catalyst precursor having a cross-section in which the three remaining alternating circles have diameters in the range between 0.74 and 1.3 times the diameter of the central circle, the overlap of each alternating circle and the central circle being less than 5% of the area of the central circle, comprising: pressing, extruding or forcing a granular or powdered catalyst or catalyst precursor material into various shapes under certain conditions, which will ensure that the particle retains the resulting shape, both during reaction as well as regeneration.

14. A die-plate designed for use in the preparation of a catalyst or catalyst precursor by extrusion, wherein the die-plate comprises one or more orifices in the shape of the cross-section of carrier particles comprising an elongated shaped particle comprising three protrusions each extending from and attached to a central position, wherein the central position is aligned along the longitudinal axis of the particle, the cross-section of the particle occupying the space encompassed by the outer edges of six circles around a central circle, each of the six circles touching two neighboring circles while three alternating circles are equidistant to the central circle and may be attached to the central circle, minus the space occupied by the three remaining outer circles and including the six interstitial regions, the shaped catalyst or catalyst precursor having a cross-section in which the three remaining alternating circles have diameters in the range between 0.74 and 1.3 times the diameter of the central circle, the overlap of each alternating circle and the central circle being less than 5% of the area of the central circle.

15. A process for the preparation of hydrocarbons comprising contacting a mixture of carbon monoxide and hydrogen with a catalyst comprising a catalytically active component or a precursor therefore, wherein the component is selected from the group consisting of ruthenium, iron, cobalt and nickel, supported on a carrier, which catalyst or catalyst precursor is an elongated shaped particle comprising three protrusions each extending from and attached to a central position, wherein the central position is aligned along the longitudinal axis of the particle, the cross-section of the particle occupying the space encompassed by the outer edges of six circles around a central circle, each of the six circles touching two neighboring circles while three alternating circles are equidistant to the central circle and may be attached to the central circle, minus the space occupied by the three remaining outer circles and including the six interstitial regions, the shaped catalyst or catalyst precursor having a cross-section in which the three remaining alternating circles have diameters in the range between 0.74 and 1.3 times the diameter of the central circle, the overlap of each alternating circle and the central circle being less than 5% of the area of the central circle, and the catalyst is optionally activated by contacting the catalyst precursor with hydrogen or a hydrogen containing gas.

16. A process comprising preparing fuels and optionally base oils from hydrocarbons produced by the process for the preparation of hydrocarbons comprising contacting a mixture of carbon monoxide and hydrogen with a catalyst comprising a catalytically active component or a precursor therefore, wherein the component is selected from the group consisting of ruthenium, iron, cobalt and nickel, supported on a cater, which catalyst or catalyst precursor is an elongated shaped particle comprising three protrusions each extending from and attached to a central position, wherein the central position is aligned along the longitudinal axis of the particle, the cross-section of the particle occupying the space encompassed by the outer edges of six circles around a central circle, each of the six circles touching two neighboring circles while three alternating circles are equidistant to the central circle and may be attached to the central circle, minus the space occupied by the three remaining outer circles and including the six interstitial regions, the shaped catalyst or catalyst precursor having a cross-section in which the three remaining alternating circles have diameters in the range between 0.74 and 1.3 times the diameter of the central circle, the overlap of each alternating circle and the central circle being less than 5% of the area of the central circle, and the catalyst is optionally activated by contacting the catalyst precursor with hydrogen or a hydrogen containing gas, by hydrogenation, hydroisomerisation and/or hydrocracking.

17. Fuels and base oils prepared by a process according to claim 16.

\* \* \* \* \*